United States Patent [19]
Elwood et al.

[11] 3,905,424
[45] Sept. 16, 1975

[54] CRYOGENIC CONTROL VALVE

[76] Inventors: Albert A. Elwood, 301 Broadway, Riviera Beach, Fla. 33404; James Patterson, 2195 Ibis Isle Rd., Palm Beach, Fla. 33480

[22] Filed: Jan. 28, 1974

[21] Appl. No.: 437,067

Related U.S. Application Data
[62] Division of Ser. No. 168,331, Nov. 26, 1971.

[52] U.S. Cl. .......... 169/46; 169/69; 137/13; 62/66
[51] Int. Cl. .............................. A62c 3/00
[58] Field of Search ...... 137/13, 15; 138/89; 62/66, 62/260; 169/69, 46, 43

[56] References Cited
UNITED STATES PATENTS

| | | | |
|---|---|---|---|
| 2,002,383 | 5/1935 | Witt | 137/13 X |
| 2,723,108 | 11/1955 | Butler | 62/66 X |
| 3,498,071 | 3/1970 | Tremont | 62/66 |
| 3,631,870 | 1/1972 | Livingston | 137/1 X |

*Primary Examiner*—Alan Cohan

[57] ABSTRACT

A cryogenic control valve for regulating the flow of material, such as a gaseous or liquid fluid, through a conduit. The control valve includes a jacket connected to the conduit, an input pipe with one end connected to a source of a low-temperature coolant, and control means to control the movement of the low temperature coolant to convert at least a portion of the fluid material in the conduit into a solid state to regulate the flow of the material through the conduit.

2 Claims, 3 Drawing Figures

3,905,424

CRYOGENIC CONTROL VALVE

This is a divisional application of application Ser. No. 168,331, filed Nov. 26, 1971.

BACKGROUND OF THE INVENTION

This invention relates to a cryogenic control valve for regulating the flow of material through a conduit, and, more particularly, to an emergency control valve for injecting a low-temperature material into a jacket surrounding the conduit or into the material flowing in the conduit to solidify at least a portion of the conduit material in order to regulate the flow of fluid through the conduit.

BRIEF DESCRIPTION OF THE INVENTION

A cryogenic control valve for regulating the flow of a fluid material through a conduit. The control valve is connected to a source of a low-temperature coolant such as liquid nitrogen, liquid helium or low-temperature compressed gaseous carbon dioxide. The valve or cryogenic valve includes a jacket that may be in the form of an over sleeve or a split sleeve. The jacket is connected about a portion of the conduit. A transfer or input pipe is connected between the source of the low-temperature coolant and the jacket to provide means to transport the coolant from the source to the jacket. The control means controls the movement of the low-temperature coolant in order to convert at least a portion of the fluid material in the conduit into a solid or highly viscous state to regulate the flow of the material through the conduit. The control means moves the coolant into the jacket to cool the fluid material in the conduit by a heat exchange through the wall of the conduit, or the control means moves the coolant into the conduit to mix directly with the fluid material to solidify the fluid in the conduit. The control means may include a conduit cutting means to open a passageway between the jacket and the conduit.

It is an object of this invention to provide a cryogenic control valve.

Another object of this invention is to provide an emergency control valve for solidifying at least a portion of the fluid in order to control the flow of fluid through the conduit.

Another object of this invention is to provide a cryogenic coolant about a fluid conduit to freeze at least a portion of the fluid to regulate the flow of fluid through the conduit.

Another object of this invention is to provide a control valve for injecting a low-temperature coolant into a conduit in order to change the state of at least a portion of the fluid to regulate the flow of fluid through the conduit.

A further object of this invention is to provide an emergency valve means to freeze flamable fluids to aid in fighting fires.

A further object of the invention is to provide an emergency valve means that reduces the temperature of the fluid below the flash point to aid in fighting fires.

An additional object of this invention is to provide an emergency valve means that generates a non-combustable gas to aid in fighting fires.

In accordance with these and other objects which will be apparent hereinafter, the present invention will now be described with particular reference to the accompanying drawings.

DESCRIPTION OF A PREFERRED EMBODIMENT

Figure 1:
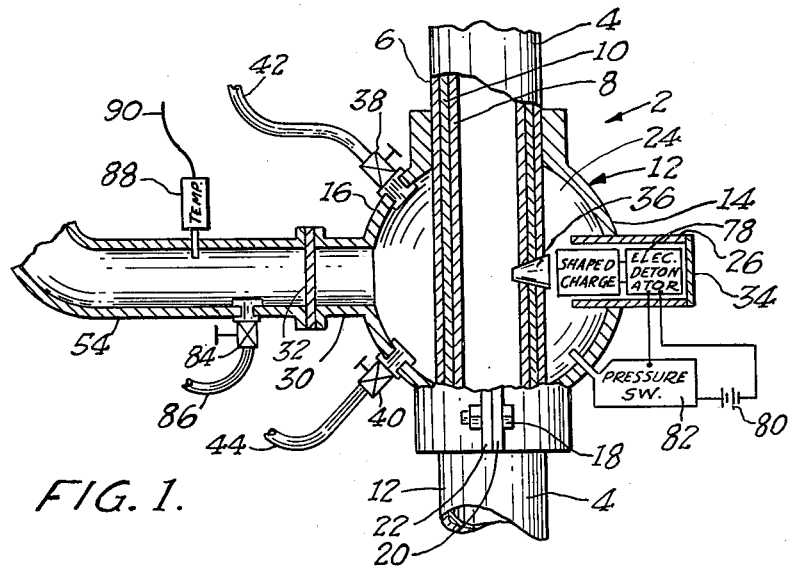
FIG. 1 is a side view of a jacket partially broken away to show the inner portions of the jacket and the fluid conduit.

Referring now to the drawings, and, particularly to FIG. 1, the cryogenic valve, generally designated by numerals 2, is utilized to regulate the flow of liquid or gas fluids in a conduit 4 by solidifying at least a portion of the fluid in the conduit or by making the fluid highly viscous. The cryogenic valve may be a permanent attachment on a conduit in a system or an attachable device as illustrated in FIG. 1. A conduit illustrated in FIG. 1 is the type of conduit used between an offshore oil well platform and the floor of a body of water. The conduit 4 includes an outer pipe 6, an inner pipe 8, and a concrete filter 10. Such conduits are used on oil well platforms for safety purposes in order to transport oil and other materials to the platform from formations beneath the surface of the floor of the body of water.

The valve 2 includes a split sleeve jacket 12 with a right side member 14 and a left side member 16. The right and left sides are connected together by bolts 18 in perimeter flanges 20 and 22. The central chamber 24 of the jacket is shown as a sphere although it may be cylindrical or other various shapes. The central chamber of the jacket 12 provides a cavity for movement of the coolant and a breech 26 to hold the shaped-charge 28. The shaped-charge may be replaced by other types of cutting means. An entrance port 30 in the jacket includes a pressure actuated valve or rupture disc means 32 to regulate the entry of the coolant into the jacket. The shaped-charge breech 26 includes an access door 34 for placing the shaped-charge in the jacket 12 adjacent the conduit 4 afer the jacket is connected to the conduit. The shaped-charge is used to cut an opening, such as illustrated by numeral 36, in the conduit 4. The jacket may include one or two purging valves 38 and 40 for removing fluids from the jacket 12, Input valve 38 may be used as a valve to allow air under pressure to be forced into jacket 12. Input valve 38 is connected to an air pressure supply source by line 42. The exit valve 40 allows the water or other fluid material to escape from the chamber 24, when subjected to air pressure. Exit valve 40 may be connected to a return line 44. Both the inlet and exit valves 38 and 40 respectively are secured in a fixed closed position prior to entry of the coolant into chamber 24.

Figure 2:
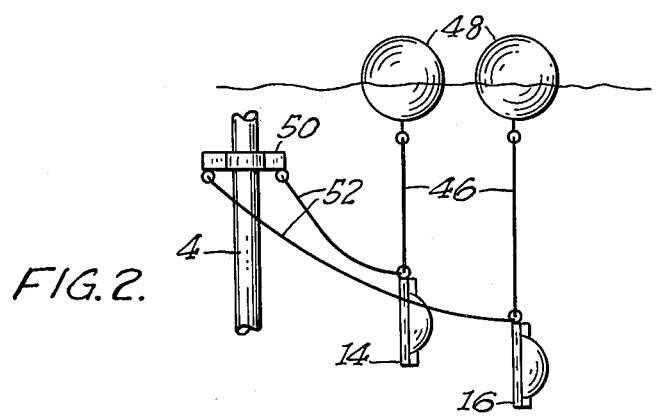
FIG. 2 is an illustration of the cryogenic valve adjacent an oil pipe for controlling oil platform fires.

The jacket 2 may be installed on the conduit 4 prior to it's installation. Or, on older offshore platforms, the two halves 14 and 16 of jacket 12 may be installed by floating the two halves of the jacket suspended on cables 46 beneath buoys 48, as shown in FIG. 2. The buoys 48 are moved down wind to a position adjacent the conduit 4. Divers are then used to connect a collar 50, to the conduit 4 and to connect cable 52 between the collar and the two halves of jacket 12. The two halves of jacket 12 are then released from the buoys and allowed to move into contact with conduit 4. The divers then bolt the two halves of jacket 12 together about pipe 4 by securing bolts 18 through flanges 20 and 22. The transfer pipe 54 is then connected between the jacket 12 and the vessel 56.

Figure 3:
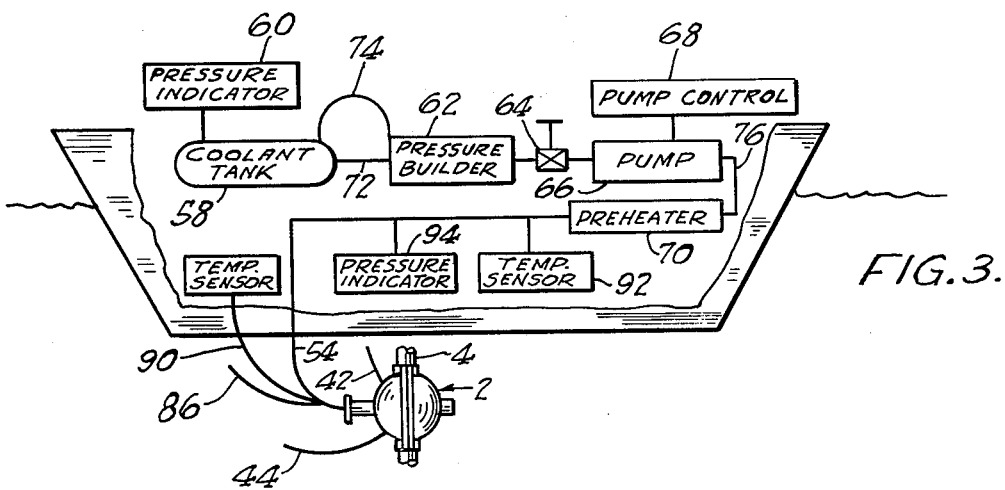
FIG. 3 is an assembly illustration showing the valve jacket connected to the oil conduit and to the control system.

The vessel, as shown in FIG. 3, carries the coolant in coolant tank, or Dewar 58, which may have additional cooling means, not shown, pressure indicator 60, pressure building means 62 for increasing the pressure in tank 58, a main control valve 64, a pump 66 with pump control means 68, and preheater 70. The coolant tank 58 is connected to the pressure building means 62 by line 72 and feedback line 74. The pressure building means 62 is connected to the pump 66 through valve 64. Line 76 connects the pump 66 to the preheater 70. The preheater 70 is connected to the other end of transfer pipe 54 connected to the jacket 12.

After the transfer pipe 54 is connected between the preheater and the jacket, and the access door 34 on the shaped-charge is secured in a closed position, the jacket 12 may be tested for leaks. Input valve 38 may be used to test the jacket. Exit valve 40 may be used to keep the tank pressure below rupture pressure to prevent rupture of the rupture valve 32. After testing, the shaped-charge 28 is connected to the electrical detonator is connected to battery 80 through pressure switch 82. The pressure switch is set to close when the pressure in chamber 24 is approximately equal to the rupture pressure of rupture valve 32. Access door 34 is opened and the shaped-charge and electrical detonator are installed in the breech. Thereafter, the access door is secured.

Purging line 42 is pressurized by a pump or pressure tank, not shown, valve 38 is opened. Valve 40 is also opened and air or nitrogen gas displaces the water other materials in jacket 12. After the jacket 12 is purged, valves 38 and 40 are shut off.

The transfer pipe 54 is purged of water by admitting nitrogen gas through a preheater 70 at a temperature above the freezing point of sea water. Valve 84 is opened and the water content of hose 54 is bled off into the sea or returned to the vessel through hose 86. Valve 84 is then closed after the transfer pipe 54 is cleared of water.

Then the transfer pipe is precooled. The transfer pipe must be precooled in order to place liquid nitrogen in the jacket chamber or in conduit 4. In addition, the transfer pipe 54 must be insulated with a coating of ice prior to pumping liquid nitrogen into the jacket 12. The transfer pipe is cooled and covered with an insulating layer of ice by opening valve 84 to allow the pump 66 to force gaseous nitrogen that is preheated to a temperature well below the freeze point of sea water (approximately −50°F) into the transfer pipe 54 and out valve 84. When temperature sensor 88 with vessel connecting line 90 indicates the desired temperature, that is the same temperature as indicated on temperature sensor 92, the preheat is reduced until temperature sensor 92 drops appreciably (approximately −100°F). The same chilling sequence may be repeated until temperature sensor 88 records the same approximate temperature as temperature sensor 92, then the temperature is reduced another step, and so on until hose transfer pipe 54 is chilled enough and isulated enough with frozen water to be filled with liquid nitrogen. The pump operator is careful to prevent the pressure in the transfer pipe 54 from exceeding the pressure required to actuate the pressure valve or rupture disk 32. Valve 84 is thereafter closed.

Upon command, the pump pressure indicated at pressure gage 94 is raised by a signal to pump control 68 that drives pump 66 at a faster rate. Preheater 70 is then inactivated. When the pressure exceeds the rupture pressure of the rupture disk 32, the disk will break. At the instant the rupture disk is broken, the pressure inside the jacket 12 goes from roughly sea water depth pressure to the preset opening pressure of valve 32, for example 1500 pounds per square inch. Pressure sensor 82 is set to actuate at approximately 50 percent of the actuation or rupture pressure of valve 32, for example 800 pounds per square inch. Actuation pressure of pressure switch 82 must be at a pressure greater than the pressure inside conduit 4 to prevent backflow of fluid into jacket 12. Pressure settings of pressure switch 82 and valve 32 are selected accordingly. Upon actuation of pressure switch 82, the detonator 78 is electrically fired which in turn ignites the shaped-charge 28 to burn a hole through pipes 6, 8 and concrete filler 10. The pump operator using pressure indicator 94 maintains the pressure at indicator 94 well above pressure inside conduit 4 so as to maintain maximum flow of liquid nitrogen into the conduit through hole 36. As the freezing operation takes place the back pressure will rise in transfer pipe 54. The pump operator will maintain a preselected pressure with continually reduced flow until the freezing operation is complete. Pump operator then maintains a slight flow of liquid nitrogen to preserve freeze. The fluid solidifies when the coolant removes heat from the fluid. The flow of fluid in the conduit may be stopped by the solidified fluid which may act as a plug in the conduit.

In the case of an offshore oil well fire, after the freeze stops the flow of oil, the platform is cooled by fire boats. Then a crew may be placed on the riser to cap conduit 4.

It should be noted that when the fluid conduit is not opened by a cutting means, exit valve 40 is opened to allow the used coolant gas to escape into the sea out of the jacket 12 or through line 44. The material flowing through the conduit is cooled through the conduit wall. The material in the conduit will gradually freeze and restrict the conduit opening.

To provide a mixing of the coolant and the fluid in the conduit, various shaped-charge explosive may be utilized, such as cyclotrimethylenetrinitramine. The coolants may be used to control gas flow as well as liquid flow in a conduit.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:
1. A method of controlling fires comprising the steps of:
   a. securing a body member to a conduit supporting the fire,
   b. transferring inert liquid cryogenic material into said body member
   c. actuating a quick opening means to open a passageway from said body member into said conduit, and
   d. supplying said cryogenic material to starve the fire of oxygen and to lower the temperature of the conduit fluid moving toward the fire.
2. A method of controlling fires as set forth in claim 10 including:
   continuously supplying said cryogenic material into said conduit to form and maintain for a time period a fixed block of frozen conduit fluid in said conduit to stop the flow of fluid to the fire.

* * * * *

UNITED STATES PATENT OFFICE
CERTIFICATE OF CORRECTION

Patent No. 3,905,424    Dated September 16, 1975

Inventor(s) ALBERT A. ELWOOD

It is certified that error appears in the above-identified patent and that said Letters Patent are hereby corrected as shown below:

Claim 2 line 2 delete "10" and insert -- 1 --.

Signed and Sealed this sixth Day of April 1976

[SEAL]

Attest:

RUTH C. MASON
Attesting Officer

C. MARSHALL DANN
Commissioner of Patents and Trademarks